United States Patent [19]
Arakawa

[11] Patent Number: 5,502,628
[45] Date of Patent: Mar. 26, 1996

[54] AC-DC CONVERTER

[75] Inventor: Koji Arakawa, Tsurugashima, Japan

[73] Assignee: Toko, Inc., Japan

[21] Appl. No.: 227,891

[22] Filed: Apr. 14, 1994

Related U.S. Application Data

[63] Continuation of Ser. No. 994,926, Dec. 22, 1992, abandoned.

[30] Foreign Application Priority Data

Dec. 27, 1991 [JP] Japan .................................. 3-360275
May 22, 1992 [JP] Japan .................................. 4-155650

[51] Int. Cl.⁶ .................................................. H02M 3/335
[52] U.S. Cl. .............................. 363/20; 363/37; 323/207
[58] Field of Search ........................... 363/20, 21, 16, 363/123, 37; 323/207, 222, 259

[56] References Cited

U.S. PATENT DOCUMENTS 4,652,809  3/1987  Barn ................................... 323/282
4,956,760  9/1990  Gulczynski ......................... 363/16
5,119,283  6/1992  Steigerwald et al. .............. 363/37
5,179,508  1/1993  Lange et al. ....................... 363/16

Primary Examiner—Steven L. Stephan
Assistant Examiner—Adolf Berhane

[57]  ABSTRACT

An AC-DC converter is disclosed which is so designed as to realize an improved power factor and thereby minimize generation of voltage distortion and higher harmonies in power supply line, without making the circuit arrangement complex and bulky. A step-down DC-DC converter is connected to an output side rectifier, and the arrangement is made such that the output current of the rectifier is permitted to flow only during a time period when the output voltage of the rectifier is higher than the voltage at an output capacitor of the DC-DC converter.

6 Claims, 4 Drawing Sheets

AC-DC CONVERTER

This application is a continuation of application Ser. No. 07/994,926, filed Dec. 22, 1992, now abandoned.

BACKGROUND OF THE INVENTION

1. Field of the Invention

The present invention relates to an AC-DC converter which is designed to realize an improved power factor and thereby minimize generation of voltage distortion and higher harmonics in power supply line.

2. Description of the Prior Art

Conventional AC-DC converter usually uses, as its input circuit, a condenser input type rectifier circuit as shown in FIG. 1, which comprises a rectifier 1 connected to commercial power supply line, a smoothing capacitor $C_1$ connected to the output terminal of the rectifier 1, a converter transformer 2, and a switching transistor $Q_1$ connected in series with the output terminal of the rectifier 1 and a primary winding $L_1$ of the converter transformer 2.

Connected to a secondary winding $L_2$ of the transformer 2 is a rectifying-smoothing circuit which comprises a rectifier diode $D_1$, flywheel diode $D_2$, choke coil $L_3$, and smoothing capacitor $C_2$.

With such an AC-DC converter, a signal derived from a pulse width modulator circuit (not shown) is supplied to the base of the switching transistor $Q_1$ to control the "on" time of the switching transistor so that a stabilized DC output is obtained across output terminals 4A and 4B. 3A and 3B indicate input terminals of the rectifier 1 which are connected to the commercial power supply line, respectively.

FIG. 2 illustrates voltage and current waveforms of the AC-DC converter shown in FIG. 1, wherein $v_1$ indicates the output waveform of the rectifier 1, and $i_1$ shows the current waveform of the rectifier 1 which consists of only the positive-going components of the input current waveform of the AC-DC converter, which input current waveform consists of alternate positive-going and negative-going components. In FIG. 2, the waveform shown mainly by dotted lines is the output voltage waveform of the rectifier 1 which occurs in the absence of the smoothing capacitor $C_1$.

With the AC-DC converter including the condenser input type rectifying circuit, the output current $i_1$ of the rectifier 1 takes such a waveform that a major portion thereof passes through the capacitor $C_1$ for a short period of time and thus the flow angle thereof is very small.

As will be seen from the above explanation, the above-mentioned conventional AC-DC converter is disadvantageous in that it provides a low power factor and is liable to generate voltage distortion and higher harmonics which occur in the power supply line. Such voltage distortion and higher harmonics will have adverse effect on other electronic equipments or the like through the commercial power supply line, and are becoming social problems today since electronic equipments such as robot or the like which must be prevented from any erroneous operation by any means are increasing in number.

FIG. 3 is a circuit diagram of another conventional AC-DC converter, parts of which correspond to those of FIG. 1 are indicated by like reference numerals or symbols. This AC-DC converter includes an active filter 5 connected to the output terminal of the rectifier 1.

The active filter 5 comprises a diode $D_3$ and choke coil $L_4$ which are connected in series with each other between the positive side output terminal of the rectifier 1 and the primary winding $L_1$ of the converter transformer 2; a transistor $Q_2$ connected between the connection of the choke $L_4$ and diode $D_3$ and the negative side output terminal of the rectifier 1; an output capacitor $C_3$ connected between the connection of the diode $D_3$ and primary winding $L_1$ and the (−) side output terminal of the rectifier 1; and a control circuit 6 for the transistor $Q_2$.

The active filter 5 is arranged such that a current proportional to the output voltage of the rectifier 1 is caused to flow through the choke coil $L_4$ by detecting the voltage at the output capacitor $C_3$ and the output voltage of the rectifier 1, and by controlling the transistor $Q_2$ by means of the control circuit 6 which operates with the detected voltage.

FIG. 4 illustrates the voltage and current waveforms of the AC-DC converter shown in FIG. 3, wherein the output voltage and output current of the rectifier 1 are represented by $v_2$ and $i_2$ respectively. The output current $i_2$ is represented as average value.

With the AC-DC converter of FIG. 3, the flow angle of the output current $i_2$ of tile rectifier is extended so that the power factor is improved and generation of the voltage distortion and higher harmonics in the power supply line is reduced.

However, the AC-DC converter shown in FIG. 3 is disadvantageous in that the entire circuit arrangement thereof becomes complicated due to the fact that the active filter 5 requires the bulky choke coil $L_4$ and a multiplier circuit (contained in the control circuit 6). The choke coil $L_4$ becomes bulky as the power to be handled increases.

SUMMARY OF THE INVENTION

Accordingly, it is an object of the present invention to provide an AC-DC converter which is designed so that the power factor can be improved and generation of voltage distortion and higher harmonics in the power supply line can be reduced without making the circuit arrangement complicated and bulky.

Briefly, according to the present invention, there is provided an AC-DC converter wherein output terminals of the rectifier which are connected to commercial power supply line, a primary winding of a converter transformer, and a switching transistor are connected in series with each other; and by controlling "on" time of the switching transistor, DC output can be derived through a rectifying-smoothing circuit connected to a secondary winding of the converter transformer, characterized in that a step-down type DC-DC converter having an output capacitor provided at the output side thereof is connected at the input side between a first connection point between the positive side output terminal of the rectifier and tile primary winding of the converter transformer and a second connection point between the negative side output terminal of the converter rectifier and the switching transistor; and there is provided means for returning the DC output power of the step-down type DC-DC converter to the above-mentioned first connection point.

As will be appreciated, the AC-DC converter of the present invention includes a step-down type DC-DC converter connected to a rectifier circuit provided at the input portion thereof, and is arranged such that the output current of the rectifier, i.e., the input current of the DC-DC converter is permitted to flow only when the output voltage of the rectifier circuit is higher than the voltage at the output capacitor of the DC-DC converter; and as compared with the conventional AC-DC converter, an extended flow angle of input current to the DC-DC converter is achieved without employing any active filter. Furthermore, an improved power factor is achieved, and generation of voltage distortion and higher harmonics in the commercial power supply line is reduced. The circuit arrangement of the present invention is simplified by virtue of the fact that it includes no multiplier circuit, as compared with the case where an active filter is utilized. Still furthermore, the choke coil provided in the input circuit i.e., in the step-down DC-DC converter may be small-sized; thus, advantageously, the size and cost can be reduced as compared with the case an active filter is employed.

Other objects, features and advantages of the present invention will become apparent from the ensuing description taken in conjunction with the accompanying drawings.

DESCRIPTION OF THE PREFERRED EMBODIMENTS

Figure 1:
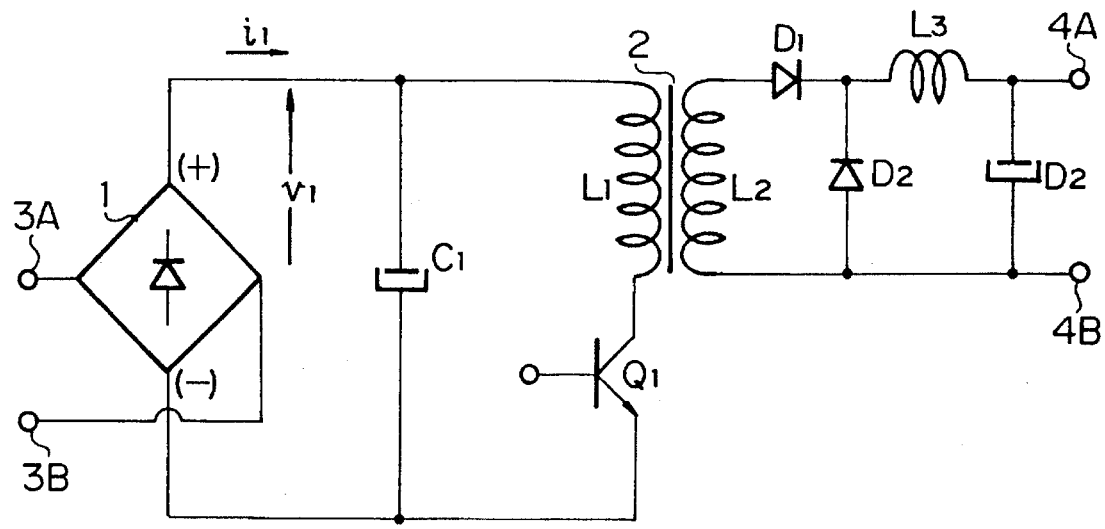
FIG. 1 is a circuit diagram of a conventional AC-DC converter.
Figure 3:
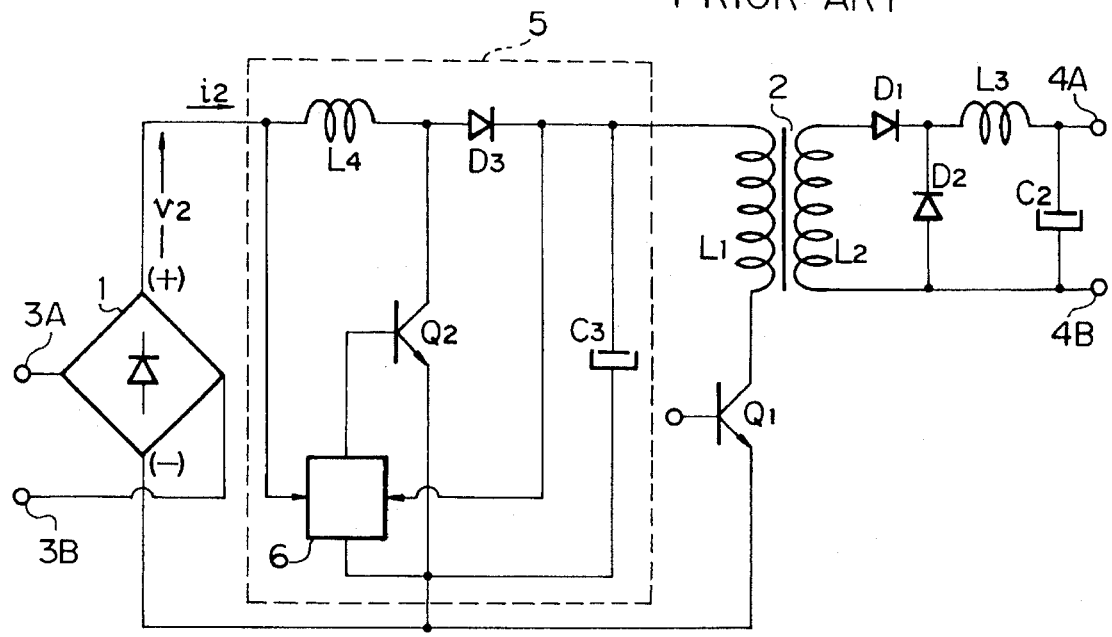
FIG. 3 is a circuit diagram of another conventional AC-DC converter.
Figure 4:
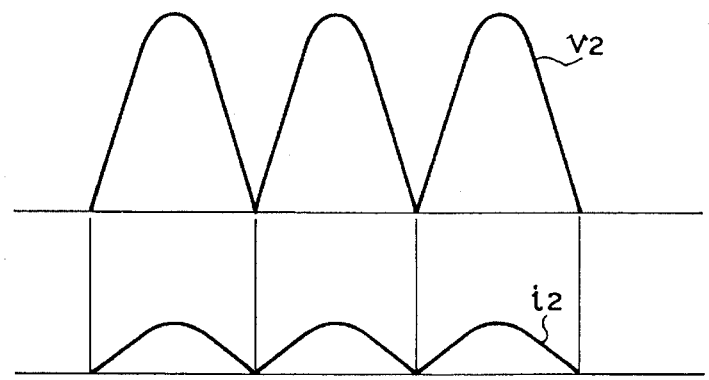
FIG. 4 illustrates voltage and current waveform which occur in the AC-DC converter of FIG. 3.
Figure 5:
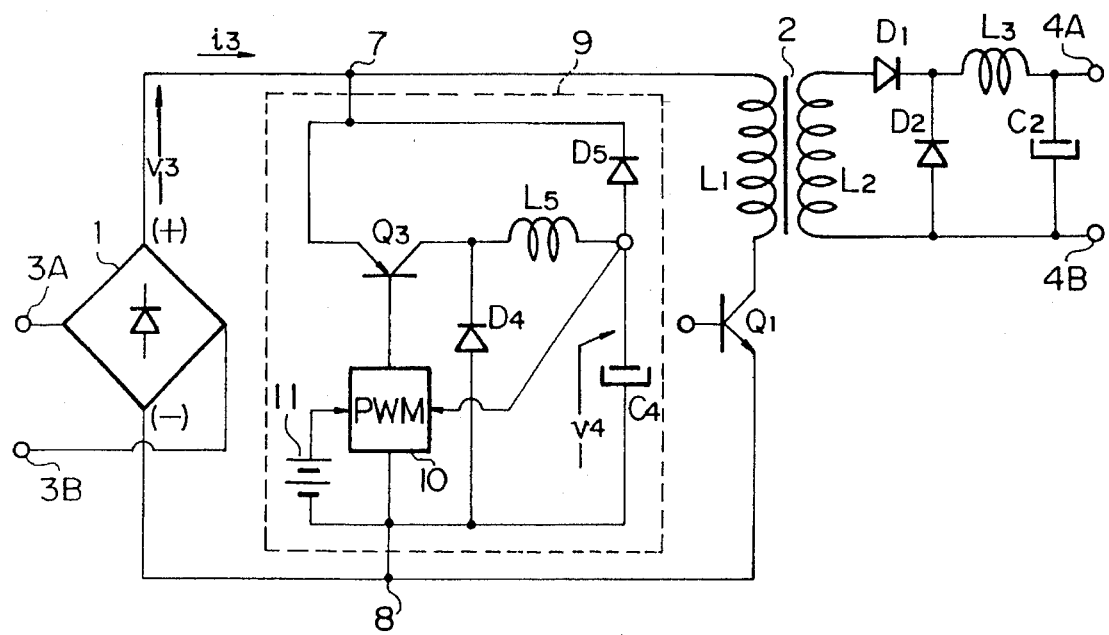
FIG. 5 is a circuit diagram showing the AC-DC converter according to an embodiment of the present invention.

Referring to FIG. 5, description will now be made of the AC-DC converter according to a first embodiment of the present invention, wherein parts similar to those of FIGS. 1 and 3 are indicated by like reference numerals or symbols. In this embodiment, output terminals of a rectifier 1, a primary winding $L_1$ of a converter transformer 2, and a switching transistor $Q_1$ are connected in series with each other; and a rectifying-smoothing circuit, which comprises a rectifier diode $D_1$, a flywheel diode $D_2$, a choke coil $L_3$ and a smoothing capacitor $C_2$, is connected to a secondary winding $L_2$ of the transformer 2, as shown in FIG. 5.

A signal derived from a pulse-width modulator circuit (not shown) is supplied to the base of the switching transistor $Q_1$ to control "on" time of the switching transistor so that a stabilized DC output is obtained across output terminals 4A and 4B.

Such an arrangement and controlling operation as mentioned just above are well known in the art, and therefore, further explanation thereof will be omitted.

The AC-DC converter according to this embodiment of this invention further comprises a step-down type DC-DC converter 9 which is connected between a first connection point 7 between the positive side output terminal of the rectifier 1 and the primary winding $L_1$ of the transformer 2 and a second connection point 8 between the negative side output terminal of the rectifier 1 and the switching transistor $Q_1$, as shown in FIG. 5.

The DC-DC converter 9 comprises a transistor $Q_3$, a choke coil $L_5$, an output capacitor $C_4$, a flywheel diode $D_4$, a reverse-current preventing diode $D_5$, a pulse-width modulator circuit 10, and a reference voltage source 11.

The transistor $Q_3$ has its emitter connected to the first connection point 7, the collector of the transistor $Q_3$ being coupled to a filter circuit which is constituted by the choke coil $L_5$ and output capacitor $C_4$. The flywheel diode $D_4$ is connected between the collector of the transistor $Q_3$ and the second connection point 8, and the diode $D_5$ is connected between the output capacitor $C_4$ and the first connection point 7.

The DC-DC converter 9 is arranged such that the output voltage of the rectifier 1 is turned on and off at a high speed with the aid of tile transistor $Q_3$ so that voltage $v_4$ at the output capacitor $C_4$ becomes equal to a preset value of $kV_R$, where k is a constant, and $V_R$ is the voltage of the reference voltage source 11.

More specifically, the pulse-width modulator circuit 10 connected to the base of the transistor $Q_3$ compares the voltage $v_4$ at the output capacitor $C_4$ with the voltage $V_R$ of the reference voltage source 11 and controls the transistor $Q_3$ so that the voltage $v_4$ becomes equal to the preset value $kV_R$ which is proportional to the voltage $V_R$.

Figure 6:
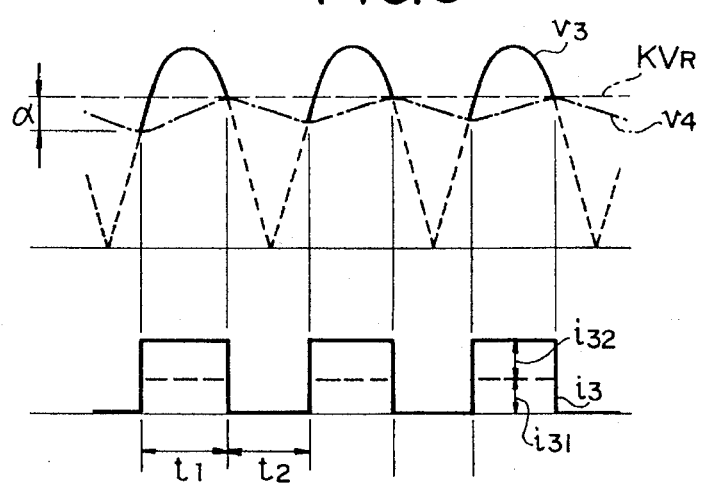
FIG. 6 illustrates voltage and current waveforms which occur in the AC-DC converter of FIG. 5.

Referring to FIG. 6 illustrating the voltage and current waveforms of the AC-DC converter shown in FIG. 5, explanation will now be made about the output voltage and the output current, represented as average value, of the rectifier 1.

During time period t, when the output voltage $v_3$ of the rectifier 1 is higher than the voltage $v_4$ at the output capacitor $C_4$, the capacitor $C_4$ of the DC-DC converter is charged so that the voltage $v_4$ builds up toward the preset value $kV_R$.

During time period $t_2$ when the output voltage $v_3$ of the rectifier 1 becomes lower than the voltage $v_4$ at the output capacitor $C_4$ as indicated by dotted lines, charging of the capacitor $C_4$ is interrupted, and the voltage $v_3$ across the output terminals of the rectifier 1, or the input voltage of the converter transformer 2 is clamped to the voltage $v_4$ at the output capacitor $C_4$ through the diode $D_5$.

The voltage $v_4$ at the capacitor $C_4$ is higher than the output voltage $v_3$ during the time period $t_2$; if the difference between the voltage w and the output voltage $v_3$ exceeds the threshold voltage $V_F$ of the reverse-current preventing diode $D_5$, then the charge at the capacitor $C_4$ will flow to the primary winding $L_1$ through the diode $D_5$. That is, the DC output power of the DC-DC converter 9 will be returned to the first connection point as energy of the AC-DC converter, and the voltage $v_4$ will gradually decrease down to a given voltage value ($kV_R-\alpha$), where $\alpha$ is a voltage value over which the voltage $v_4$ at the capacitor $C_4$ drops from the preset value $kV_R$ as a result of the capacitor $C_4$ being discharged.

Meanwhile, the output voltage $v_3$ of the rectifier 1 changes from decrease to increase, and when it becomes higher than the value ($kV_R-\alpha$) of the voltage $v_4$ at the capacitor $C_4$, the operation performed during the time period $t_1$ is repeated.

In this way, the DC-DC converter 9 performs such cyclic operations that the output capacitor $C_4$ is charged during the time period $t_1$ when the output voltage $v_3$ of the rectifier 1 is higher than the voltage $v_4$ at the output capacitor $C_4$ while during the time period $t_2$ when the output voltage $v_3$ of the rectifier 1 is lower than the voltage $v_4$ at the output capacitor $C_4$, the output capacitor $C_4$ is discharged, so that energy is supplied to the AC-DC converter which serves as the main converter.

In the above-mentioned cyclic operations, the output current $i_3$ of the rectifier 1 is permitted to flow only during the time period $t_1$ when tile output voltage $v_3$ of the rectifier 1 is higher than the voltage $v_4$ at the output capacitor $C_4$, thereby providing energy of the AC-DC converter and energy for charging the capacitor $C_4$. In FIG. 6, that portion of the output current $i_3$ which flows through the capacitor $C_4$ is indicated by $i_{31}$, and that portion which flows in the AC-DC converter is represented by $i_{32}$.

During the time period $t_2$ when the voltage $v_3$ across the output end terminals the rectifier 1 is lower than the voltage $v_4$ at the output capacitor $C_4$, energy discharged from the capacitor $C_4$ is used to provide DC output of the AC-DC converter so that the current 13 does not flow.

Figure 7:
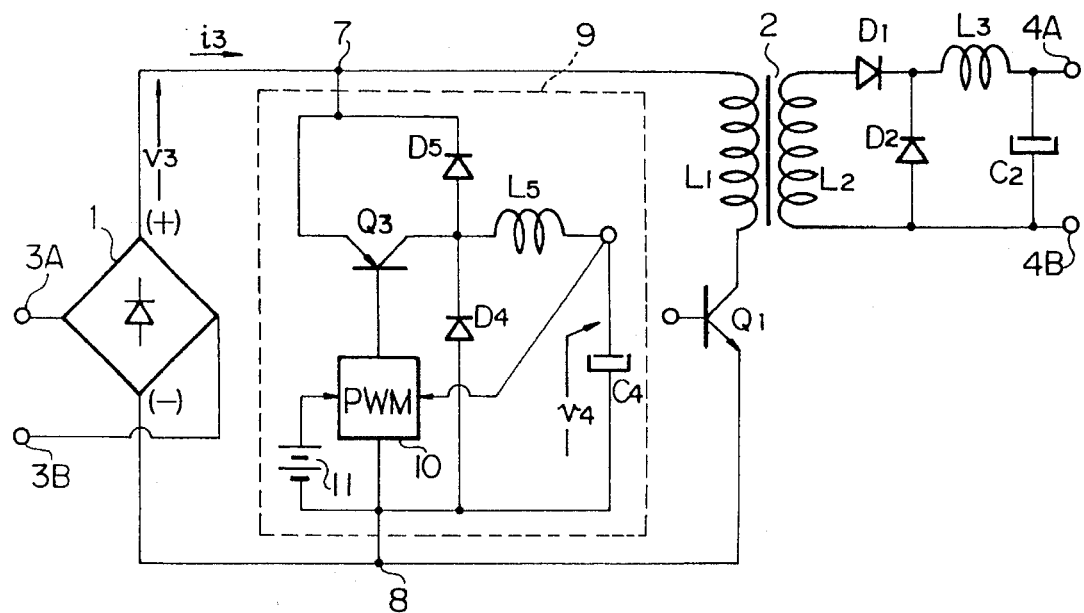
FIG. 7 is a circuit diagram showing the AC-DC converter according to a second embodiment of the present invention.

FIG. 7 is a circuit diagram of the AC-DC converter according to a second embodiment of the present invention, wherein parts corresponding to those of FIGS. 1, 3 and 5 are indicated by like reference numerals or symbols.

With the circuit arrangement shown in FIG. 5 energy discharged from an output capacitor $C_4$ is returned to a first connection point 7 through a diode $D_5$ connected between the output capacitor $C_4$ and the first connection point 7. In contrast thereto with the circuit arrangement of FIG. 7, the diode $D_5$ is connected between the first connection point 7 and the transistor $Q_3$ side end of a choke coil $L_5$ provided at the input end of a filter circuit which is constituted by the output capacitor $C_4$ and choke coil $L_5$ so that energy discharged from the output capacitor $C_4$ is returned to the first connection point 7 through the choke coil $L_5$ and diode $D_5$.

It will be noted that the circuit arrangement of FIG. 7 is similar to that of FIG. 5 except that the diode $D_5$ is connected at a different position.

Figure 8:
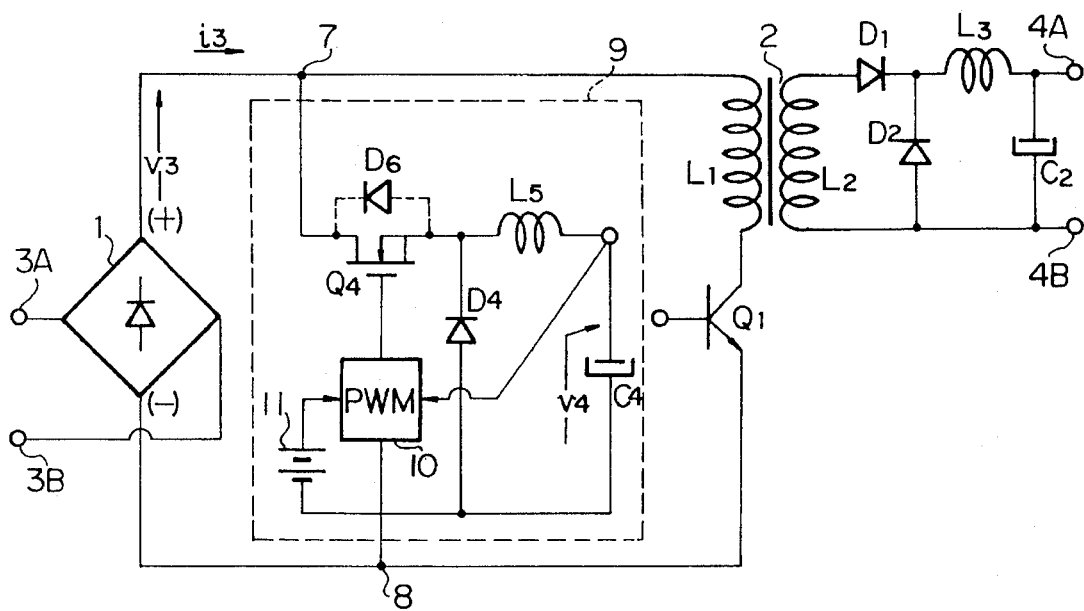
FIG. 8 is a circuit diagram showing the AC-DC converter according to a third embodiment of the present invention.

Referring to FIG. 8, there is shown the AC-DC converter according to a third embodiment of the present invention, wherein parts corresponding to those of FIGS. 1, 3, 5 and 7 are indicated by like reference numerals or symbols. It will be noted that the AC-DC converter according to this embodiment is similar to those shown in FIGS. 5 and 7, except for the circuit arrangement of step-down type DC-DC converter 9.

In this embodiment, the DC-DC converter 9 comprises a MOS type field effect transistor $Q_4$, a choke coil $L_5$, an output capacitor $C_4$, a flywheel diode $D_4$, a pulse-width modulator circuit 10, and a reference voltage source 11.

The transistor $Q_4$ has its drain connected to a first connection point 7 and its source coupled to a filter circuit which is constituted by the choke coil $L_5$ and output capacitor $C_4$. A flywheel diode $D_4$ is connected between the source of the transistor $Q_4$ and a second connection point 8.

$D_6$ is a parasitic diode which occurs in the transistor $Q_4$, the forward direction of the diode $D_6$ being in the direction from the source of the transistor $Q_4$ to the first connection point 7.

The DC-DC converter 9 is arranged such that the output voltage of the rectifier 1 is turned on and off at a high speed with the aid of the transistor $Q_4$ so that voltage $v_4$ at the output capacitor $C_4$ becomes equal to a preset value of $kV_R$, where k is a constant, and $V_R$ is the voltage of the reference voltage source 11.

More specifically, the pulse-width modulator circuit 10 connected to the gate of the transistor $Q_4$ compares the voltage $v_4$ at the output capacitor $C_4$ with the voltage $V_R$ of the reference voltage source 11 and controls the transistor $Q_4$ so that the voltage $v_4$ becomes equal to the preset value $kV_R$ which is proportional to the voltage $V_R$.

Description will now be made of the operation of the AC-DC converter shown in FIG. 8. The operation of this circuit arrangement is the same with that of the AC-DC converter shown in FIGS. 5 and 7, and thus voltage and current waveforms occurring at various points are as shown in FIG. 6.

During time period when the output voltage $v_3$ of the rectifier 1 is higher than the voltage $v_4$ at the output capacitor $C_4$, the capacitor $C_4$ of the DC-DC converter a is charged so that the voltage $v_4$ builds up toward the preset value $kV_R$.

During time period when the output voltage $v_3$ of the rectifier 1 becomes lower than the voltage $v_4$ at the output capacitor $C_4$, charging of the capacitor $C_4$ is interrupted, and the voltage at the output end of the rectifier 1, or the input voltage of the converter transformer 2 is clamped to the voltage $v_4$ at the output capacitor $C_4$ through the choke coil $L_5$ and parasitic diode $D_6$.

If the voltage $v_4$ at the capacitor $C_4$ is higher than tile output voltage $v_3$ of the rectifier 1, and if the difference therebetween exceeds tile threshold voltage $V_F$ of the parasitic diode $D_6$, then the charge at the capacitor $C_4$ will flow to the primary winding $L_1$ through the choke coil $L_5$ and parasitic diode $D_6$. That is, the DC output power of the DC-DC converter 9 will be returned as energy of the AC-DC converter, and the voltage $v_4$ will gradually decrease down to a given voltage value $(kV_R-\alpha)$, where $\alpha$ is a voltage value over which the voltage $v_4$ at the capacitor $C_4$ drops from the preset value $kV_R$ as a result of the capacitor $C_4$ being discharged.

Meanwhile, the output voltage $v_3$ of the rectifier 1 changes from decrease to increase, and when it becomes higher than the value $(kV_R-\alpha)$ of the voltage $v_4$ at the capacitor $C_4$, the output capacitor $C_4$ is charged again so that the voltage $v_4$ builds up toward the preset value $kV_R$.

In this way, the DC-DC converter 9 performs such cyclic operations that the output capacitor $C_4$ is charged during the time period when the output voltage $v_3$ of the rectifier 1 is higher than the voltage $v_4$ at the output capacitor $C_4$ while during the time period when the output voltage $v_3$ of the rectifier 1 is lower than the voltage $v_4$ at the output capacitor $C_4$, the output capacitor $C_4$ is discharged, so that energy is supplied to the AC-DC converter which serves as the main converter.

It will be appreciated that the circuit arrangement of FIG. 8 is advantageous over those shown in FIGS. 5 and 7 in that the number of diode elements can be less by one.

Figure 2:
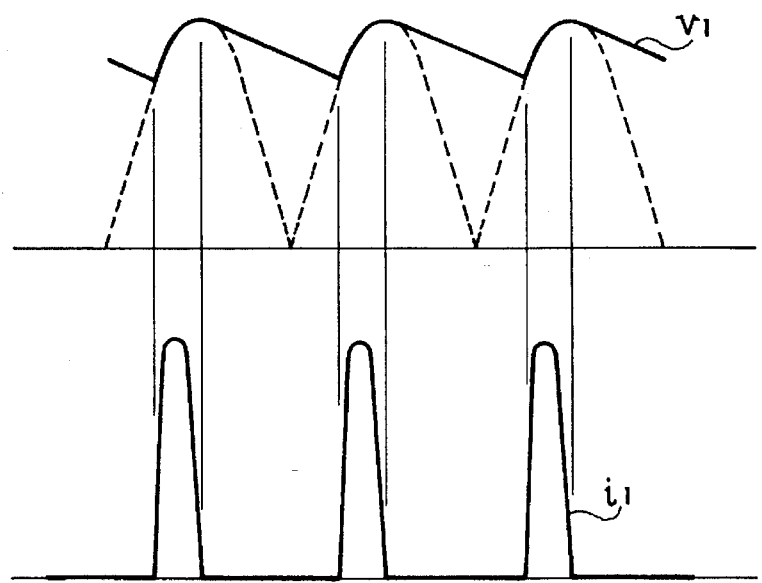
FIG. 2 illustrates voltage and current waveforms which occur in the AC-DC converter of FIG. 1.

Assuming that the specifications for the input and output are the same with each other, and comparing the present AC-DC converters shown in FIG. 5, 7 and 8 and the conventional AC-DC converter using condenser input type rectifier circuit shown in FIG. 1, it is seen that the integrated value of the current $i_1$ flowing for the short time intervals in FIG. 2 and the integrated value of the current $i_3$ flowing during the time period $t_1$ in FIG. 6 are same values, and thus that current $i_3$ flowing during the time period $t_1$ in the AC-DC converter of this invention takes a truncated wide waveform. The output current $i_3$ consists of only the positive-going components of the input current waveform.

This means that the output current of the rectifier has a greater flow angle than in the case of the conventional AC-DC converter using condenser input type rectifier circuit, and thus that according to the present invention, it is possible to provide an AC-DC converter having a substantially enhanced power factor and capable of reducinging generation of voltage distortion and higher harmonics in the power supply line.

Assuming that the maximum value of the output voltage $v_3$ of the rectifier 1 is $V_P$ and that such a relationship as $kV_R = V_P/2^{1/2}$ holds true between the maximum value $V_P$ and the preset value $kV_R$ for the voltage $v_4$ at the capacitor $C_4$, the following relationship holds true: $t_1 = t_2$.

With the AC-DC converter using active filter shown in FIG. 3, since the active filter is a step-up type circuit, a voltage of about 360 V is usually used as the voltage for the capacitor $C_3$. Thus, energy handled by the choke coil $L_4$ turns out to be higher than a value given by the following expression (1):

$$\{(360 \times 100 \cdot 2^{1/2})/360\} \times P_\phi \quad (1)$$

With the circuit of the present invention, on the other hand, energy handled by the choke coil $L_5$ turns out to be lower than a value given by the following expression (2):

$$(100 \cdot 2^{1/2} - kV_R)/(100 \cdot 2^{1/2})\} \times P_\phi \quad (2)$$

where $P_\phi$ is power transmitted from the input end to the output end of the AC-DG converter. In this case, the commercial power source input is A.C. 100 V; $kV_R$ is D.C. 100 V; the value of the expression (1) is $0.6P_\phi$; and the value of the expression (2) is $0.3P_\phi$. Thus, it will be appreciated that according to the present invention, the size of the construction can be greatly reduced by virtue the fact that energy to be handled by the choke coil is low as compared with the case where active filter is employed.

While as the step-down type DC-DC converter, chopper type one was employed in the illustrated embodiments, it goes without saying that another switching type may be useful instead of chopper type.

The preset value for the voltage at the output capacitor of the DC-DC converter does not have to be limited to 100 V, but may take an optimum value according to the specification for tile AC-DC converter.

No specific limitation has to be laid upon the relationship in frequency between pulse for controlling the transistor of the DC-DC converter and pulse for controlling the switching transistor of the AC-DC converter which serves as main converter.

While in the illustrated embodiments, description has been made of the case where the AC-DC converter is of the forward type, it is to be understood that similar effect can be produced in the case where the AC-DC converter is of the flyback type.

The switching transistor of the AC-DC converter may comprise a MOS type field-effect transistor instead of a bipolar transistor used in the illustrated embodiments.

In the embodiments of FIGS. 5 and 7, the step-down type DC-DC converter can be an insulated type one using a transformer, and tile transistor used therewith may be a MOS type field effect transistor.

While the present invention has been illustrated and described with respect to specific embodiments thereof, it is to be understood that the present invention is by no means limited thereto but encompasses all changes and modifications which will become possible without departing from the scope of the appended claims.

I claim:

1. An improved AC-DC converter wherein a primary winding of a converter transformer, and a switching transistor are connected in series with each other between output terminals of a rectifier connected to a commercial power supply line; and by controlling "on" time of said switching transistor, a stabilized DC output is derived through a rectifying-smoothing circuit connected to a secondary winding of said converter transformer, the improvement comprising: a step-down type DC-DC converter including at the output side thereof a filter circuit, said step-down type DC-DC converter being connected between a first connection point between the positive side output terminal of said rectifier and said primary winding and a second connection point between the negative side output terminal of said rectifier and the negative side of said switching transistor; an output capacitor forming said filter circuit and at the output side of said filter circuit; and a reverse current preventing element connected between the output side of said DC-DC converter and said first connection point, said reverse current preventing element forming a current path along which energy stored at said output capacitor is returned to said first connection point, whereby said output capacitor is charged only with a current flowing through said step-down DC-DC converter through operation of said step-down type DC-DC converter; voltage appearing across said output capacitor as a result of said output capacitor being charged is controlled by said step-down DC-DC converter so as to be always lower than a peak value of output voltage of said rectifier; the energy stored at said output capacitor is returned to said first connection point through said reverse-current preventing element irrespective of operation of the switching element of said DC-DC converter.

2. An AC-DC converter according to claim 1, wherein a diode is provided as said reverse current preventing element, said diode being connected between said output capacitor of said step-down type DC-DC converter and said first connection point in such a manner that the direction from said output capacitor to said first connection point becomes the forward direction for said diode, whereby DC output of said step-down type DC-DC converter is returned to said first connection point through said diode.

3. An AC-DC converter according to claim 1, wherein a diode is provided as said reverse current preventing element, said diode being connected between the input terminal of said filter circuit of said step-down type DC-DC converter and said first connection point in such a manner that the direction from the input terminal of said filter circuit to said first connection point becomes the forward direction for said diode, whereby DC output power of said step-down type DC-DC converter is returned to said first connection point through said diode.

4. An AC-DC converter according to claim 1, wherein non-insulated step-down type DC-DC converter using MOS type field effect transistor is utilized as switching transistor in said step-down type DC-DC converter; and said MOS type field effect transistor is connected in such a manner that the forward direction of a parasitic diode existing in said field effect transistor conforms to the direction from said output capacitor toward said first connection point so that said parasitic diode serves as said reverse current preventing element, whereby DC output power of said step-down type DC-DC converter is returned to said first connection point through said parasitic diode.

5. An AC-DC converter according to claim 1, wherein said step-down DC-DC converter comprises a transistor having its emitter connected to said first connection point; a filter circuit comprising a choke coil connected to the collector of said transistor, and an output capacitor connected between the other end of said choke coil and said second connection point; a flywheel diode connected between the connection point between said choke coil and said transistor and said second connection point; a reference voltage source; and a pulse-width modulator circuit connected between the base of said transistor and said second connection point, said pulse-width modulator circuit being adapted for comparing output of said output capacitor with said reference voltage source to control the output of said capacitor so that said output conforms to a preset voltage.

6. An AC-DC converter according to claim 1, wherein said step-down type DC-DC converter comprises a field effect transistor having its drain connected to said first connection point; a filter circuit comprising a choke coil connected to source of said transistor and an output capacitor connected between the other end of said choke coil and said second connection point; a flywheel diode connected between the connection point between said choke coil and said transistor and said second connection point; a reference voltage source; and a pulse-width modulator circuit connected between the gate of said transistor and said second connection point, said pulse-width modulator circuit being adapted for comparing output of said output capacitor with said reference voltage source to control the output said output capacitor so that said output conforms to a preset voltage.

\* \* \* \* \*